Patented Feb. 14, 1928.

1,659,359

UNITED STATES PATENT OFFICE.

IVAN GUBELMANN, HENRY J. WEILAND, AND OTTO STALLMANN, OF SOUTH MIL-WAUKEE, WISCONSIN, ASSIGNORS TO THE NEWPORT COMPANY, OF CARROLLVILLE, WISCONSIN, A CORPORATION OF DELAWARE.

3'-5'-DIAMINO-4'-HYDROXY-ORTHO-BENZOYL-BENZOIC ACID AND PROCESS OF MAKING THE SAME.

No Drawing. Application filed November 29, 1926. Serial No. 151,592.

This invention relates to 3'-5'-diamino-4'-hydroxy-ortho-benzoyl-benzoic acid and a process for making the same.

We have discovered that 3'-5'-diamino-4'-hydroxy-ortho-benzoyl-benzoic acid can be prepared by the reduction of the corresponding 3'-5'-dinitro-4'-hydroxy-ortho-benzoyl-benzoic acid. The latter compound has been described in our co-pending application entitled 3'-5'-dinitro-4'-hydroxy-ortho-benzoyl-benzoic acid and a process of making the same, Serial No. 151,591, filed November 29, 1926. The general reduction reaction may be expressed by the following chemical equation:

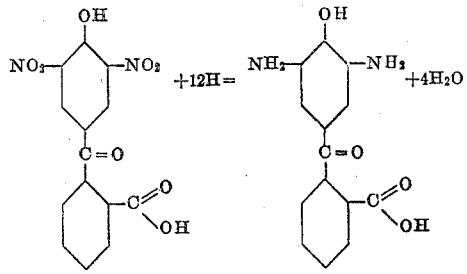

The method of reduction used is similar to the general method of reducing dinitro bodies with iron and dilute acids. However, we do not wish to limit our method to any specific reduction process, since the dinitro body may be reduced by other methods, such as electrolytically, by hydrogen and a catalyst, by tin and hydrochloric acid, by sulfides and the like.

3'-5'-diamino-4'-hydroxy-ortho-benzoyl-benzoic acid in a pure state is a light yellowish brown crystalline powder which without melting decomposes slowly above 250° C. It is readily soluble in alcohol and other organic solvents, in diluted caustic soda and in ammonia. It is practically insoluble in water, but soluble in dilute mineral acids. It absorbs nitrous acid in dilute mineral acid solution up to about 95% of the theoretical amount for the two amino groups. The alkaline water solution is deep yellow in color.

Without limiting our invention to any particular procedure, the following example, in which parts by weight are given, illustrates the application of our invention in the preferred form:

To 3000 parts of water are added 450 parts of iron powder and 60 parts of glacial acetic acid. This mixture is heated to 90–95° C. and there is added to it over a period of three hours, while maintaining a temperature of 90–95° C., a paste consisting of 332 parts of 3'-5'-dinitro-4'-hydroxy-ortho-benzoyl-benzoic acid and 1500 parts of hot water. The reduction mass is maintained at a temperature of 95° C. for an additional one hour. The reduction mass is then neutralized by the addition of a solution of 122 parts of soda ash dissolved in 500 parts of water. To the neutralized reduction mass, there is further added a solution of 105 parts of sodium sulfide (100%) in 500 parts of water. A temperature of 96–98° is maintained for one-half hour longer.

The neutralized reduction mass is then filtered off from the iron, the latter being thoroughly washed with 1000 parts of hot water. The mother liquor and wash water are then combined and to the combined filtrate are added about 910 parts of 20° Bé. HCl. The mass is boiled for two hours, cooled down to 25° C. and filtered. The filtrate is then exactly neutralized with 275 parts of caustic soda, 40° Bé. solution. After stirring over night, the final product, 3'-5'-diamino-4'-hydroxy-ortho-benzoyl-benzoic acid, is filtered off and washed on the filter with about 1000 parts of cold water. After drying at 100° C., a yield of 244 parts, corresponding to about 90% of the theoretical yield is obtained.

We are aware that numerous details of the process may be varied without departing from the spirit of this invention, and we do not desire limiting the patent granted otherwise than as necessitated by the prior art.

We claim as our invention:

1. As a new article of manufacture, 3'-5'- diamino-4'-hydroxy-ortho-benzoyl-benzoic acid, having the following formula:

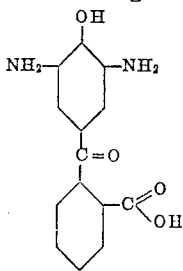

2. The process of preparing 3'-5'-diamino-4'-hydroxy-ortho-benzoyl-benzoic acid, which comprises adding to a mixture of iron and dilute acid maintained at a temperature of 90° to 95° C. a paste of 3'-5'-dinitro-4'-hydroxy-ortho-benzoyl-benzoic acid in water, maintaining the temperature of the mass at approximately 95° C. until reduction is complete, neutralizing the reduction mass, adding thereto a solution of sodium sulphide, filtering off the iron, acidifying the filtrate, filtering, exactly neutralizing the last resulting filtrate and filtering off the precipitated product, 3'-5'-diamino-4'-hydroxy-ortho-benzoyl-benzoic acid.

In testimony whereof we have hereunto subscribed our names.

IVAN GUBELMANN.
HENRY J. WEILAND.
OTTO STALLMANN.